United States Patent
Inoue et al.

(10) Patent No.: US 7,228,073 B2
(45) Date of Patent: Jun. 5, 2007

(54) OPTICAL SIGNAL TRANSMISSION DEVICE

(75) Inventors: Jun Inoue, Koganei (JP); Hideyuki Sotobayashi, Koganei (JP); Wataru Chujo, Koganei (JP); Hitoshi Kawaguchi, Koganei (JP)

(73) Assignee: National Institute of Information and Communications Technology, Incorporated Administrative Agency, Tokyo (JP)

( * ) Notice: Subject to any disclaimer, the term of this patent is extended or adjusted under 35 U.S.C. 154(b) by 708 days.

(21) Appl. No.: 10/615,394

(22) Filed: Jul. 9, 2003

(65) Prior Publication Data

US 2005/0008366 A1    Jan. 13, 2005

(51) Int. Cl.
*H04J 4/00* (2006.01)
*H04J 14/08* (2006.01)
*H04B 10/08* (2006.01)

(52) U.S. Cl. .............................. 398/75; 398/35; 398/98
(58) Field of Classification Search .................. 398/74, 398/75, 98, 35, 183
See application file for complete search history.

(56) References Cited

U.S. PATENT DOCUMENTS

| | | | |
|---|---|---|---|
| 6,504,972 B2 * | 1/2003 | Watanabe | 385/24 |
| 2003/0002833 A1 * | 1/2003 | Futami et al. | 385/122 |
| 2003/0223462 A1 * | 12/2003 | Fu et al. | 370/500 |

* cited by examiner

*Primary Examiner*—Dalzid Singh
(74) *Attorney, Agent, or Firm*—Foley and Lardner LLP

(57) ABSTRACT

An optical signal transmission device for transmitting phase information of optical signals is provided. The device includes a multiplexing formatted optical signal generator arranged to generate multiplexing formatted optical signals. The device also includes an optical phase generator arranged to receive the multiplexing formatted optical signals. An optical information transmission method for transmitting optical signal information including phase information is also provided. The method includes receiving multiplexing formatted optical signals generated by a multiplexing formatted optical signal generator at an optical phase generator. The method also includes phase conjugating the multiplexing formatted optical signals by means of four wave mixing (FWM).

5 Claims, 14 Drawing Sheets

OPTICAL SIGNAL TRANSMISSION DEVICE

BACKGROUND OF THE INVENTION

1. Field of the Invention

The present invention relates to an optical signal transmission device that makes use of both optical time division multiplexing (OTDM) Carrier Suppressed—Return to Zero (CS-RZ) signals and four wave mixing induced by Optical phase conjugation (OPC).

2. Description of the Related Art

To transmit an optical time division multiplexing (OTDM) signal at a 1.55-μm band in a standard single mode fiber (SSMF) with a zero-dispersion at a 1.3 μm band, the wavelength and nonlinearity in the fiber must be compensated. As one method for compensating for the wavelength dependence in the fiber, a method that uses dispersion compensated fiber arranged after transmission fiber is known (A. D. Ellis and D. M. Spirit, "Unrepeatered transmission over 80 km standard fiber at 40 Gbit/s," *IEE Electron. Lett.*, 1994, 30, (1), pp. 72–74). Further, as a method to compensate for the wavelength dependence (chromatic dispersion) in the fiber, optical phase conjugation (OPC) is known (A. Yariv, D. Fekete, and D. M. Pepper, "Compensation for channel dispersion by nonlinear optical phase conjugator (OPC)," OSA Opt. Lett., 1979, 4, (2), pp. 52–54; S. Watanabe, T. Naito, and T. Chikama, "Compensation of chromatic dispersion a single-mode fiber by optical phase conjugation," IEEE Photon. Technol. Lett., 1993, 5, (1), p. 92–95; R. M. Jepson, A. H. Gnauck and R. M. Derosier, "Compensation of fiber chromatic dispersion by spectral inversion," IEE Electron. Lett., 1993, 29, (7), p. 576–578; M. C. Tatham, G. Sherlock, and L. D. Westbrook, "Compensation fiber chromatic dispersion by optical phase conjugation in a semiconductor laser amplifier," IEE Electron. Lett., 1993, 29, (21), pp. 1851–1852).

The concept of dispersion compensation using OPC was first proposed by Yariv et al. in 1978 (A. Yariv, D. Fekete, and D. M. Pepper, "Compensation for channel dispersion by nonlinear optical phase conjugator," OSA Opt. Lett., 1979, 4, (2), pp. 52–54). In this technique, an optical phase conjugator is arranged at the mid point of the transmission route. A signal, the quality of which becomes worse due to wavelength dispersion in the fiber, is received by the optical phase conjugator, and the optical phase conjugator emits a phase conjugate signal, the frequency of which is inverted as compared to the original signal. One characteristic of dispersion compensation using OPC is that it does not require a complicated design.

Optical transmission devices employing OPC have been reported (S. Watanabe, T. Naito, and T. Chikama, "Compensation of chromatic dispersion a single mode fiber by optical phase conjugation," IEEE Photon. Technol. Lett., 1993, 5, (1), p. 92–95; R. M. Jopson, A. H. Gnauck and R. M. Derosier, "Compensation of fiber chromatic dispersion by spectral inversion," IEE Electron. Lett., 1993, 29, (7), p. 576–578; M. C. Tatham, G. Sherlock, and L. D. Westbrook, "Compensation fiber chromatic dispersion by optical phase conjugation in a semiconductor laser amplifier," IEE Electron. Lett., 1993, 29, (21), pp. 1851–1852). OPC may classified into two categories based on the media used by the device to generate phase conjugated light. In one category, the device uses optical fiber (S. Watanabe, T. Naito, and T. Chikama, "Compensation of chromatic dispersion a single-mode fiber by optical phase conjugation," IEEE Photon. Technol. Lett., 1993, 5, (1), p. 92–95; R. M. Jopson, A. H. Gnauck and R. M. Derosier, "Compensation of fiber chromatic dispersion by spectral inversion," IEE Electron. Lett., 1993, 29, (7), p. 576–578). In the other category the device uses a semiconductor optical amplifier (SOA) (M. C. Tatham, G. Sherlock, and L. D. Westbrook, "Compensation fiber chromatic dispersion by optical phase conjugation in a semiconductor laser amplifier," IEE Electron. Lett., 1993, 29, (21), pp. 1851–1852). Both of these devices make use of Four Wave Mixing (FWM) induced in the nonlinear media.

An optical signal transmission device, wherein a 80 Gbit/s OTDM signal is transmitted over 106 km SSMF using a 1.2 ps optical pulse, is reported by Feiste et al. (U. Feiste, R. Ludwig, C. Schmidt, E. Dietrich, S. Diez, H. J. Ehrke, E. Patzak, H. G. Weber, and T. Merker, "80-Gb/s transmission over 106-km standard-fiber using optical phase conjugation in a Sagnac-interferometer," IEEE Photon. Technol. Lett., 1999, 11, (8), pp.1063–1065).

SUMMARY OF THE INVENTION

According to one aspect of the present invention there is provided an optical signal transmission device and method capable of transmitting OTDM-CS-RZ signals and phase information thereof over a fiber transmission route, where the fiber transmission route may include SSMF.

According to another aspect of the present invention, the optical signal transmission device may transmit the OTDM-CS-RZ signals and phase information thereof in SSMF using four wave mixing (FWM) induced by OPC.

According to another aspect of the present invention the signal light of the optical signal transmission device may be 1560 nm.

According to another aspect of the present invention the optical phase conjugation device includes at least one semiconductor optical amplifier (SOA).

According to another aspect of the present invention the optical phase conjugation device includes two or more SOAs.

According to another aspect of the present invention there is provided an optical signal transmission device for transmitting phase information of optical signals. The optical signal transmission device comprises a multiplexing formatted optical signal generator arranged to generate multiplexing formatted optical signals, and an optical phase generator that receives the multiplexing formatted optical signals. According to one aspect of this aspect of the invention, the bit rate of the multiplexing formatted optical signals may be at least 80 Gbit/s. According to another aspect of this aspect of the invention, the multiplexing formatted optical signal generator may comprise an optical time division multiplexing (OTDM) carrier suppressed—return to zero (CS-RZ) signal generator arranged to generate OTDM-CS-RZ signals comprising signal light, and the optical phase generator may comprise an optical phase conjugator arranged to receive the OTDM-CS-RZ signals from the OTDM CS-RZ signal generator.

According to another aspect of the present invention the optical phase conjugator comprises: a continuous wave (CW) pump light source that emits pump light, a pump light amplifier arranged to amplify the pump light emitted by the CW pump light source, a first phase conjugator arranged to arrange the phase of the signal light, a signal light amplifier arranged to amplify the signal light; a second phase conjugator arranged to arrange the phase of the signal light; an optical coupler arranged to couple the signal light and the pump light from the first phase conjugator and the second phase conjugator and emit the coupled light and provide phase conjugated light, a first and a second semiconductor optical amplifier (SOA) arranged to amplify the coupled light, and a light filter arranged to filter the phase conjugated light from the second SOA.

According to another aspect of the inventions, the multiplexing formatted optical signal generator comprises: a first optical coupler arranged to divide a received signal evenly at a rate of 1:1 into a first portion and a second portion, a first phase shifter arranged to receive the first portion and to arrange the phase of the first portion, a second phase shifter arranged to receive the second portion and to arrange the phase of the second portion, a second optical coupler arranged to couple the light emitted by the first phase shifter with the light emitted by the second phase shifter and emit a first coupled signal, a third optical coupler arranged to divide the first coupled signal evenly at a rate of 1:1 into a third portion and a fourth portion, a third phase shifter arranged to receive the third portion and to arrange the phase of the third portion, a fourth phase shifter arranged to receive the fourth portion and to arrange the phase of the fourth portion, and a fourth optical coupler arranged to couple the light emitted by the third phase shifter with the light emitted by the fourth phase shifter and emit a second coupled signal. According to further aspects of this aspect of the invention the multiplexing formatted optical signal generator may further comprise: a fifth optical coupler arranged to divide the second coupled signal evenly at a rate of 1:1 into a fifth portion and a sixth portion, a fifth phase shifter arranged to receive the fifth portion and to arrange the phase of the fifth portion, a sixth phase shifter arranged to receive the sixth portion and to arrange the phase of the sixth portion; and a sixth optical coupler arranged to couple the light emitted by the fifth phase shifter with the light emitted by the sixth phase shifter and emit a third coupled signal.

According to another aspect of the present invention the optical phase conjugation device comprises a first transmission route comprising standard single mode fiber (SSMF) between the multiplexing formatted optical signal generator and the optical phase generator, and a second transmission route after the optical phase generator, wherein both the first transmission route and the second transmission route are longer than 100 km.

According to another aspect of the present invention, there is provided an optical information transmission method for transmitting optical signal information including phase information. The method comprises receiving multiplexing formatted optical signals generated by a multiplexing formatted optical signal generator at an optical phase generator, and phase conjugating the multiplexing formatted optical signals by means of four wave mixing (FWM). According to one aspect of this aspect of the present invention, the the multiplexing formatted optical signals may comprise optical time division multiplexing carrier suppressed—return to zero (OTDM-CS-RZ) signals.

According to another aspect of the present invention, there is provided an optical signal transmission device comprising an optical time division multiplexing (OTDM) carrier suppressed—return to zero (CS-RZ) signal generating means for generating OTDM-CS-RZ signals comprising signal light, and an optical phase conjugating means for receiving the OTDM signals from the OTDM-CS-RZ signal generating means.

DETAILED DESCRIPTION OF THE PREFERRED EMBODIMENTS

Figure 1:
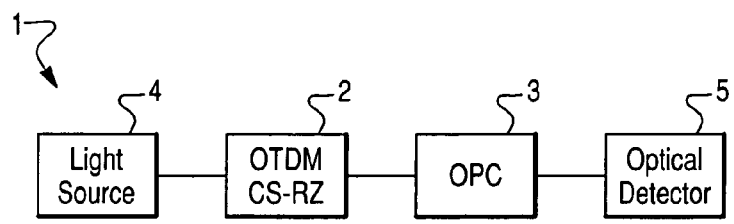
FIG. 1 is a schematic diagram of an embodiment of an optical signal transmission device according to an exemplary embodiment of the present invention.

FIG. 1 is schematic illustrating a first exemplary embodiment of an optical signal transmission device according to the present invention. As shown in FIG. 1, the optical signal transmission device comprises a multiplexing formatted optical signal generator 2, such as an OTDM-CS-RZ signal generator, for generating multiplexing formatted optical signals, such as OTDM-CS-RZ signals, and an optical phase generator 3, such as an optical phase conjugator. While FIG. 1 illustrates the multiplexing formatted optical signal generator 2 to be a OTDM-CS-RZ signal generator and the optical phase generator 3 to be a optical phase conjugator, the invention is not so limited. The optical signal transmission device also includes a light source 4 and an optical detector system 5. A preferred light source is a mode-locked laser diode (MLLD). In this application OTDM (optical time division multiplexing) means an optical multiplexing technique that divides same wavelength optical signals by time and assigns the signals to multiple channels. CS (carrier suppressed) means a phenomenon wherein the carrier frequency is suppressed by shifting the phase of a neighboring signal by $\pi$ in Time Division Multiplexing (TDM). RZ (return-to-zero) means a signal where the signal value returns to 0 in 0 bit frame when the signal is 1.

Figure 2:
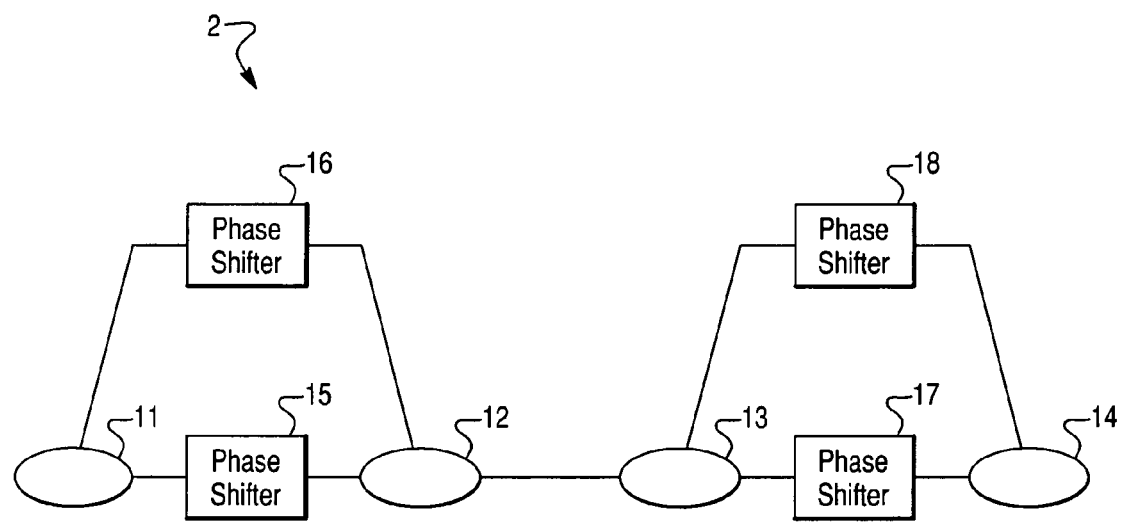
FIG. 2 is a schematic of a carrier suppressed transmission route of an OTDM-CS-RZ signal generator according to an exemplary embodiment of the invention.

The multiplexing formatted optical signal generator 2 comprises, for example, a CS transmission route as shown in FIG. 2. The multiplexing formatted optical signal generator 2 includes optical couplers 11–14 and phase shifters 15–18. Each of the phase shifters 15–18 preferably includes two electrodes arranged in a face-to-face manner in the upper side of the transmission route and lower side of transmission route. Each phase shifter heats the portion of the optical transmission route which is between its electrodes, where the heat supplied depends on the amplitude of the electric current applied to the electrodes. By heating the transmission route portions to change the temperature through the use of electrodes, the electric current can alter the phase of an optical pulse that is transmitted along the transmission route.

Figure 3A:
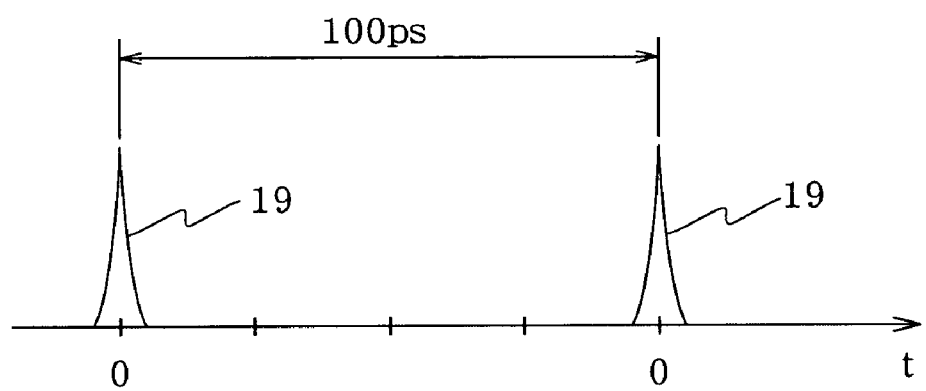
FIG. 3(a) illustrates 10 Gbit/s (receive) pulses.
Figure 3B:
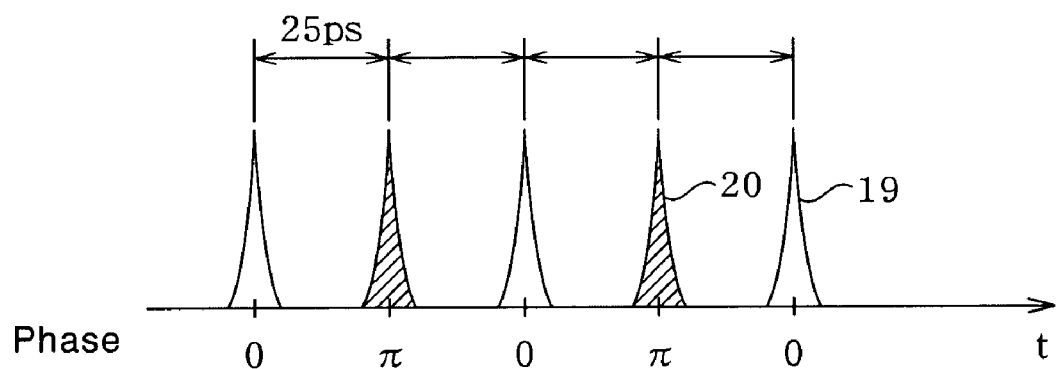
FIG. 3(b) illustrates 40 Gbit/s CS-RZ (emission) pulses.

FIG. 3(*a*) illustrates a 10 Gbit/s pulse with a period of 100 ps received into the CS-RZ transmission route. The optical pulse is divided into two pulses evenly at a rate of 1:1 by the first optical coupler 11. The light pulse that passes the second phase shifter 16 delays the pulse by 50 ps (one-half the period of the pulse received into the CS-RZ transmission route) as compared with the light pulse that pass the first phase shifter 15. The second optical coupler 12 couples the two pulses (from the first phase shifter 15 and the second phase shifter 16) together. The coupled light pulse is divided by a third optical coupler 13 into two pulses evenly at a rate of 1:1. The light pulse that passes the fourth phase shifter 18 delays the pulse by 25 ps (one-half the delay of the second phase shifter 15) as compared with the light pulse that passes the third phase shifter 17. The fourth optical coupler 14 couples these two pulses (from the third phase shifter 17 and the fourth phase shifter 18) together. In FIG. 3(*b*), the light pulse 19 has a phase of 0 and the light pulse 20 has a phase of $\pi$. As shown in FIG. 3(*b*), 40 Gbit/s pulses are obtained with a period of 25 ps and a phase which changes by $\pi$ at every 25 ps from the input 10 Gbit/s pulse with 100 ps period (see FIG. 3(*a*)). The phase of the spectrum returns to the same value every 50 ps, and corresponds to an imposed modulation of 20 GHz. Thus, CS-RZ transmission route as shown in FIG. 2 shifts by 20 GHz in the frequency regime and the spectrum of the carrier frequency is suppressed.

Figure 4:
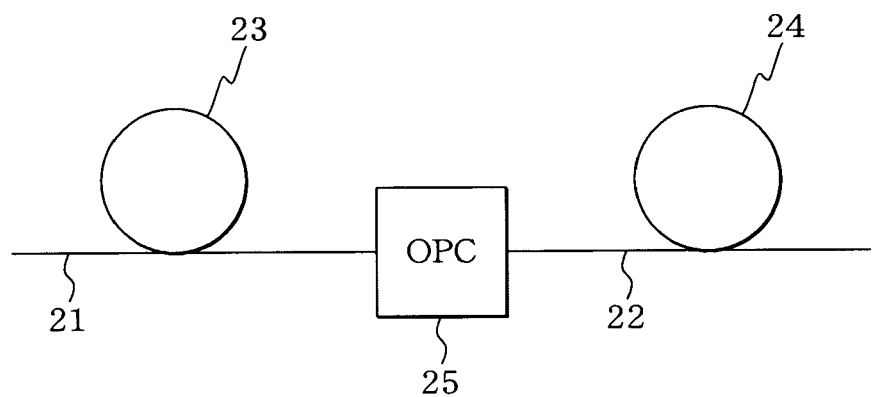
FIG. 4 is a schematic diagram of an optical signal transmission device according to an exemplary embodiment of the present invention.

FIG. 4 is a schematic diagram of an exemplary embodiment of an optical signal transmission device including an optical phase conjugator as the optical phase generator according to the invention. As shown in FIG. 4, the optical signal transmission device including an optical phase conjugator comprises, for example, light paths 21, 22, SMFs 23, 24 and an optical phase conjugator 25. A short pulse emitted by a transmission section travels along light path 21 and reaches SMF 23. The transmission pulse is broadened as it passes through the fiber due to the dispersion in the fiber. At the mid point of the transmission fiber (between SMF 23 and SMF 24), the optical spectrum of the signal pulse is spectrally inverted using the optical phase conjugator 25 based on four-wave mixing (FWM). The SMFs 23, 24 may be SSMF, for example.

Figure 5:
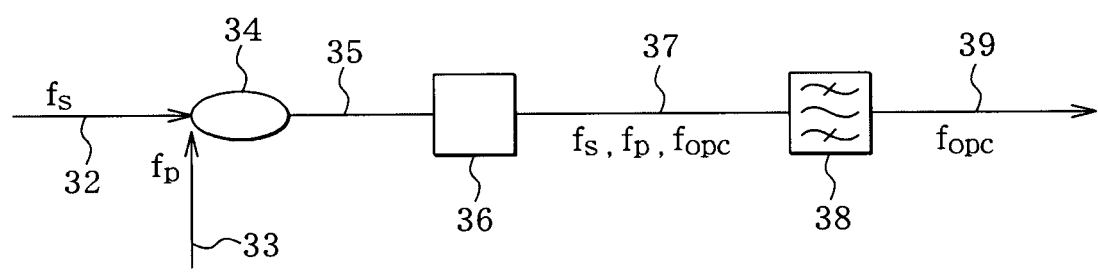
FIG. 5 illustrates one exemplary embodiment of an optical phase conjugator according to an exemplary embodiment of the present invention.

FIG. 5 illustrates an exemplary embodiment of an optical phase conjugator according to the invention. As illustrated in FIG. 5, the optical phase conjugator preferably comprises light path 32 where signal light ($f_s$) is received, light path 33 where the pump light ($f_p$) is received, optical coupler 34 where the signal light ($f_s$) and the pump light ($f_p$) are coupled together and emitted therefrom, light path 35 where the light emitted from the optical coupler 34 is received, nonlinear medium 36 where the light traveling along light path 35 is received, light path 37 where the light emitted from the nonlinear medium 36 is received, light filter 38 that filters the light emitted from the nonlinear medium 36, and the light path 39 where the light emitted from the light filter 38 is received.

Figure 6:
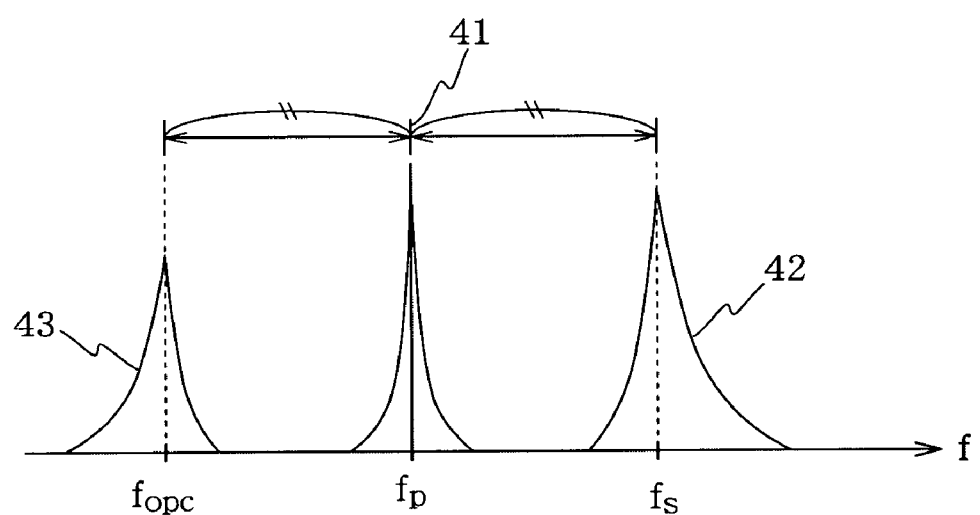
FIG. 6 illustrates the relationship between a pump signal ($f_p$), a receive signal ($f_s$), and phase conjugated light ($f_{OPC}$).

As shown in FIG. 6, phase conjugated light is emitted by means of FWM when pump light ($f_p$) 41 and signal light ($f_s$) 42 are received into a nonlinear medium, such as a semiconductor optical amplifier (SOA), for example. The phase conjugated light ($f_{OPC}$) is emitted at a frequency of $f_{OPC}=2f_p-f_s$, and the amplitude is proportional to the square of the amplitude of the pump light and proportional to the amplitude of the signal light. (See Hitoshi Kawaguchi, (FWM in SOA and the application thereof), Applied physics, Vol. 63, No. 12, pp. 1219-1226, December 1994.).

The optical phase conjugator comprising an SOA has advantages, such as smaller size, and increased stability and optical gain. When an optical phase conjugator comprising an SOA is used, pattern effects emerge due to the optical gain of the SOA. The carrier lifetime in an SOA, which may be as short as 100 ps, causes the optical gain when the lifetime is close to the bit rate of the light pulse of the transmission system. The pattern effect causes a difference in the amplified rate of each bit light due to the bit pattern of the received signal. When FWM in a SOA is the mechanism providing optical phase conjugation, the received power of the signal light is preferably set lower to control the pattern effect. The pattern effect is caused by the modulation of gain in the SOA due to the pattern of the received signal. Thus, the use of low power signal light makes it possible to reduce the pattern effect. The amplitude of the phase conjugate light can be compensated by increasing the power of the pump light.

Figure 7:
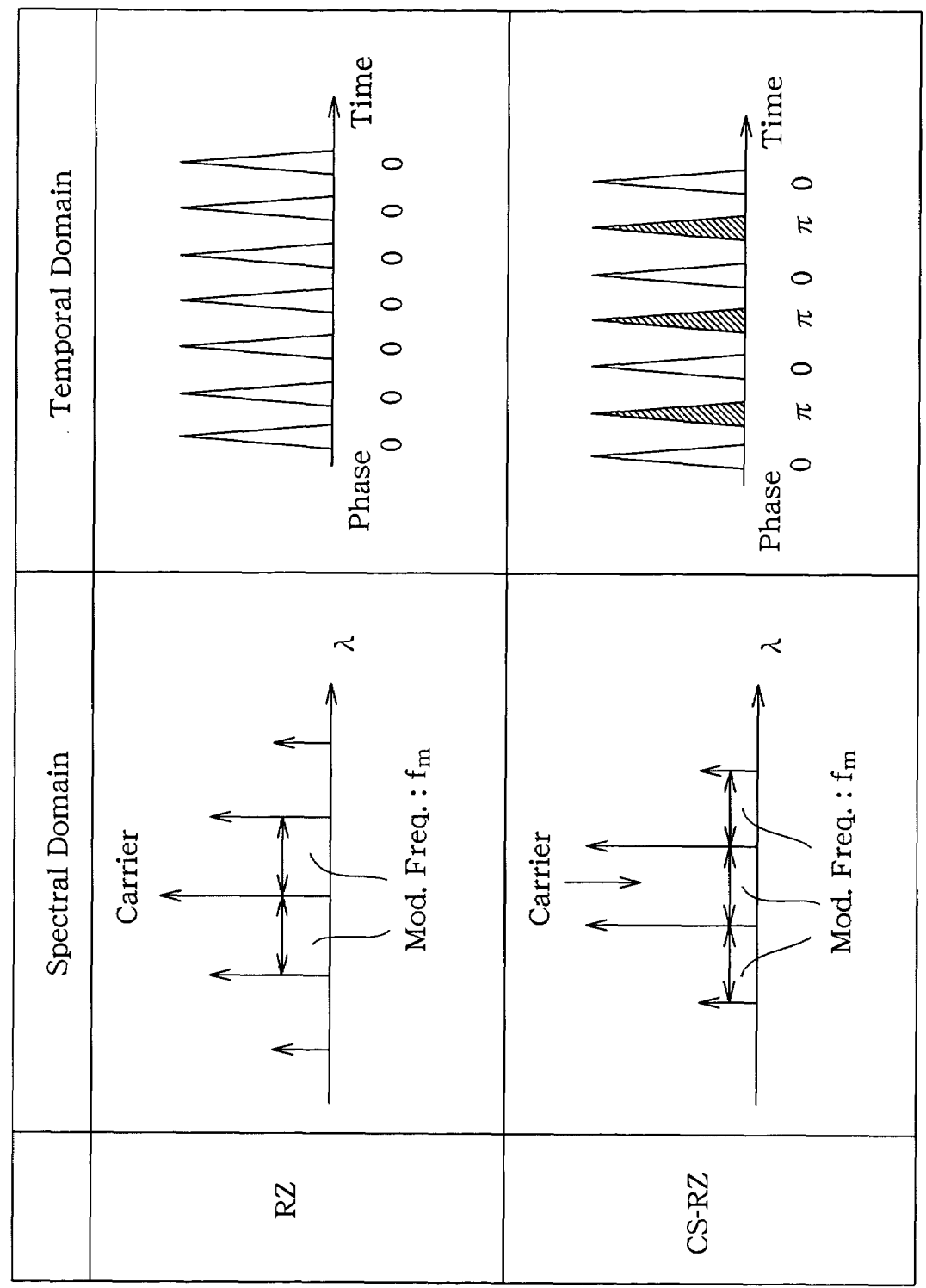
FIG. 7 illustrates the comparison between an RZ signal and a CS-RZ signal in both the frequency domain and time domain.

Because an optical phase conjugator preserves phase information, optical phase conjugators are readily applicable for use with CS-RZ signals. FIG. 7 illustrates the comparison between an RZ signal and a CS-RZ signal in both the frequency domain and time domain. In an RZ signal, there is a signal at the carrier frequency in the frequency domain, and the phase along the pulse train remains the same in the time domain. On the other hand, for a CS-RZ signal, the carrier frequency is suppressed in the frequency domain, and phase of neighboring light pulses differ by $\pi$ in the time domain.

Figure 8:
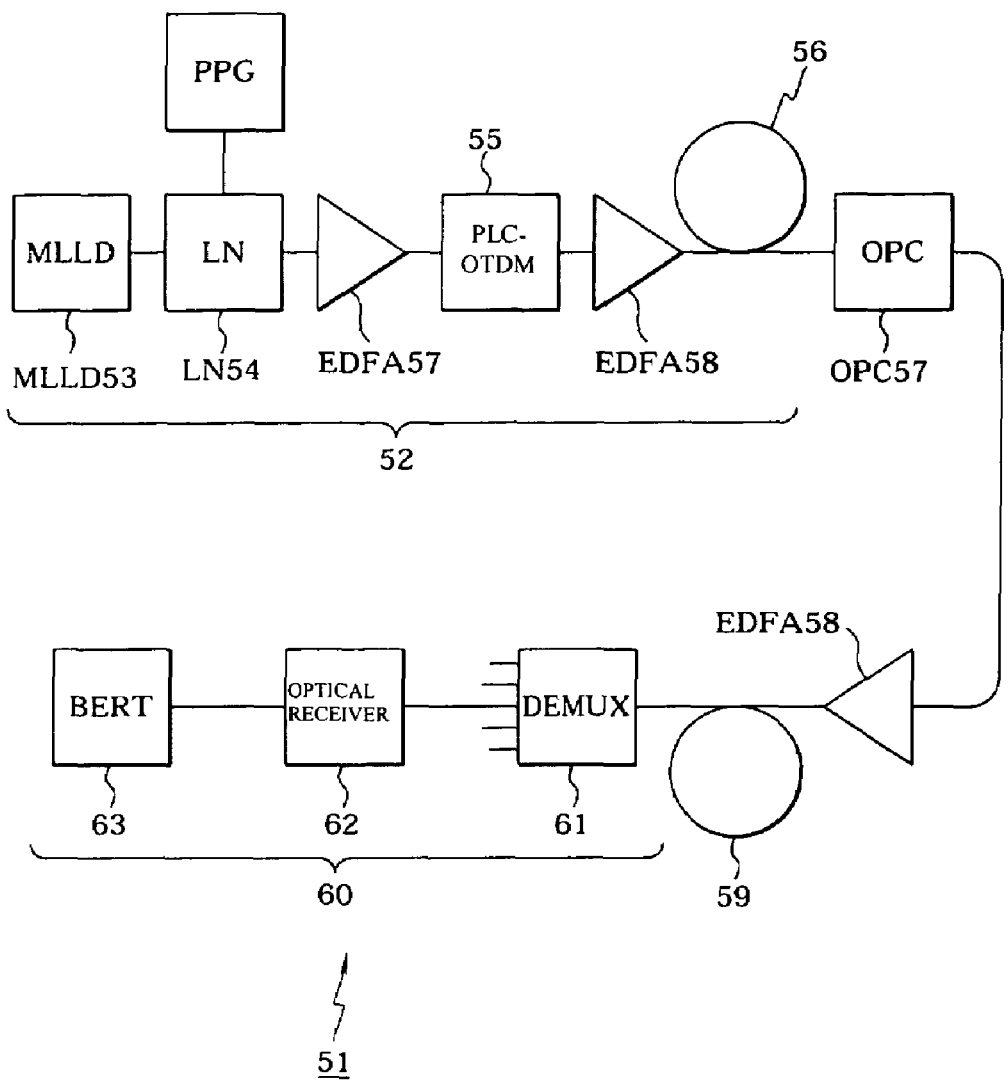
FIG. 8 is a schematic of a setup for CS-RZ signal transmission and demultiplexing according to an exemplary embodiment of the invention.

FIG. 8 is a schematic of a setup for CS-RZ signal transmission and demultiplexing according to an exemplary embodiment of the invention. An optical transmission device that uses 80 Gbit/s OTDM-RZ is described, although the present invention is not limited to a particular transmission rate or wavelength. The transmission portion 52 comprises an MLLD 53, LiNbO$_3$ modulator (LN) 54, planer light wave circuit optical time division multiplexor (PLC-OTDM) 55 and SMF 56. The transmission portion 52 may also comprise optical phase conjugator 57 and erbium-doped fiber amplifier (EDFA) 58. The transmission portion 52 emits 80 Gbit/s 1560 nm RZ optical pulses, with a pulse width of about 2.9 ps, for example. For a 1560 nm MLLD, a pulse width of about 3 ps may be used. The length ($L_1$) of the first span of SMF 56 is 102.8 km. The length ($L_1$) multiplied by the second order dispersion, $\beta_2$, is −2281 ps². The length ($L_2$) of the second span of SMF 59 is set to 105.0 km and the product of the second order dispersion, $\beta_2$, and the second span length is given as ($\beta_2(2)L_2$). The length ($L_2$) balances that dispersion due to the first length of ($\beta_2(1)L_1$) such that the difference is ($\beta_2$ (1)($L_1$)-2283 ps²).

Light emitted from OPC 57 is amplified by EDFA 58 and travels through the SMF 59. The light that travels through SMF 59 is detected by detector system 60. The detector system 60 comprises demultiplexer 61 that selects specific light pulses from the light pulses from SMF 59, optical receiver 62 that receives the light that was selected and emitted by the demultiplexer 61 and transforms it to an electrical signal, and bit rate error measuring device 63 that measures the bit error produced in the transmission of light pulses using the electrical signal that is received from the optical receiver 62.

The signal light that was transmitted through all 208 km of the SMF 56 and 59 by the above described optical signal transmission device may then be demultiplexed (DEMUX) in 10 Gbit/s by a TOAD (not shown) (terahertz optical asymmetric demultiplexer), such as one described for example in (J. P. Sokoloff, P. R. Prucnal, I. Glesk, and M. Kane, "A terahertz optical asymmetric demultiplexer (TOAD)," *IEEE Photon. Technol. Lett.*, 1993, 5, (7), pp. 788–790).

Figure 9:
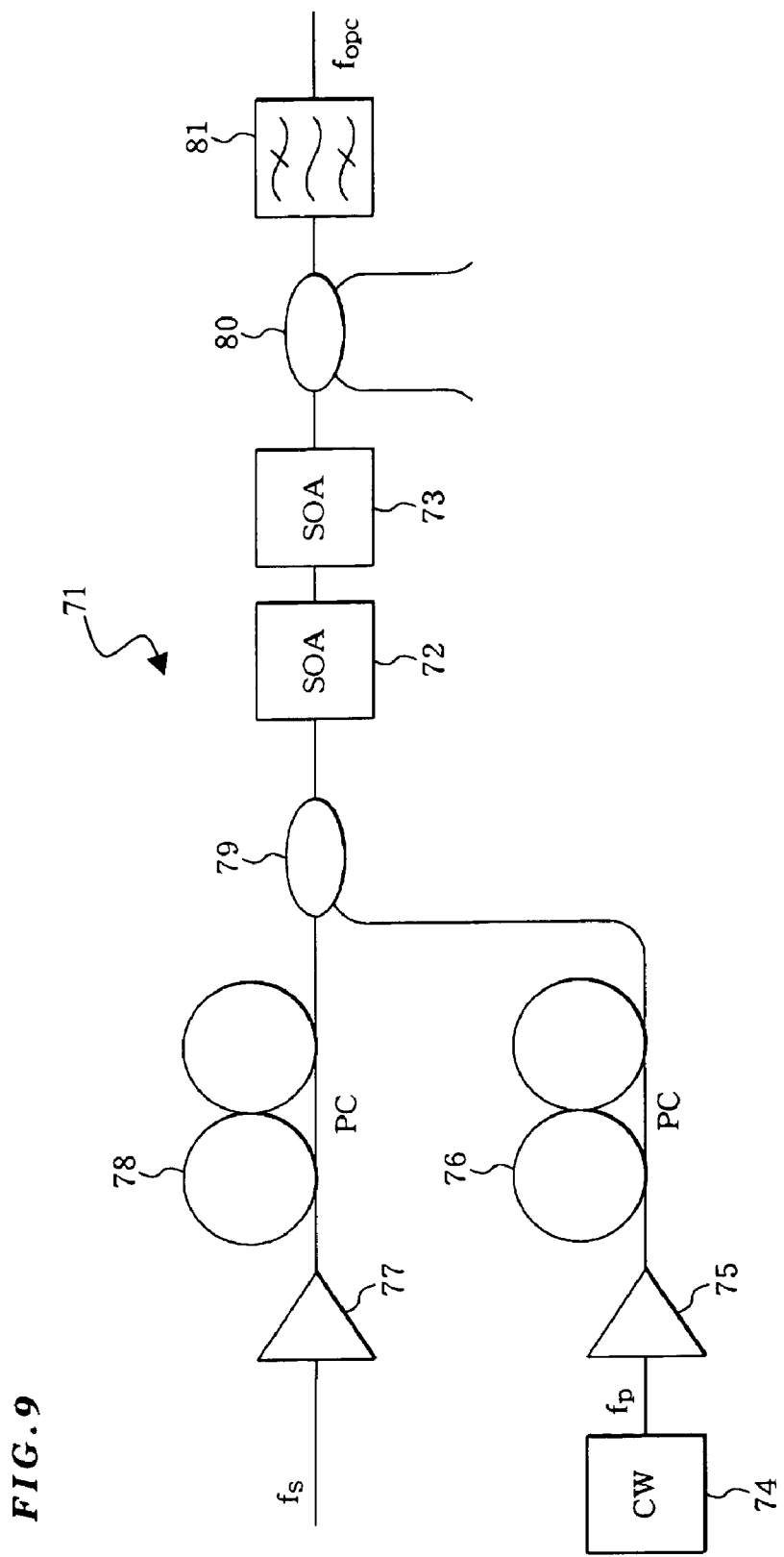
FIG. 9 is a schematic of an optical phase conjugator according to an exemplary embodiment of the invention.

FIG. 9 illustrates a preferred example of an optical phase conjugator according to an exemplary embodiment of the invention. In this embodiment, the optical phase conjugator 71 comprises two SOAs 72, 73 arranged in a tandem configuration. The optical phase conjugator 71 also comprises continuous wave (CW) pump light source 74 emitting 1555 nm light, EDFA 75 amplifying the light emitted by the CW pump light source 74, phase conjugator 76 that arranges the phase of pump light ($f_p$), EDFA 77 amplifying the signal light ($f_s$), phase conjugator 78 that arranges the phase of signal light ($f_s$), optical coupler 79 that couples and emits the signal light ($f_s$) and the pump light ($f_p$) from the phase conjugator 78 and the phase conjugator 76, respectively. The light emitted from the optical coupler 79 passes to the two tandem SOAs 72, 73, which provides phase conjugated light. The optical phase conjugator 71 also includes optical coupler 80 that receives the phase conjugated light emitted from the two tandem SOAs 72, 73 and outer terminal, and light filter 81 that filters the phase conjugated light emitted from the two SOAs 72, 73.

A phase conjugate wave at 1550 nm, the spectrum of which is inverted by FWM, is emitted by the optical phase conjugator 71. The two stage SOA provides high conversion efficiency, because the efficiency is proportional to the cube of the gain (See J. Zhou, N. Park, J. Vahara, M. A. Newkirk, and B. I. Miller, "Four-wave mixing wavelength conversion efficiency in semiconductor traveling-wave amplifiers measured to 65 nm of wavelength shift," *IEEE Photon. Technol. Lett.*, 1994, 6, (8), pp. 984-987).

A second embodiment of the present invention is explained below. This embodiment relates to a CS-RZ optical signal transmission device, where the basic structure of the device is similar to the RZ optical transmission device explained above. Thus, the basic structure of the device in this embodiment is described with regard to FIG. 8.

One of the differences between a CS RZ device and an RZ device is that neighboring 80 Gbit/s pulses have a phase difference of π in the CS-RZ device, namely the phase of the pulse train in the CS-RZ device is ( . . . , 0, π, 0, π, 0, π, . . . ). This phase of the pulse train may be obtained by arranging the last phase shifter of a time divisional multiplexer that comprises a planer light wave circuit (PLC) (See H. Sotobayashi, K. Kitayama, and W. Chujo, "Photonic gateway: TDM to WDM to TDM conversion and reconversion at 40 Gbit/s (4×10 Gbit/s)," OSA J. Opt. Soc. Am. B, 19, (11), 2002).

Figure 10:
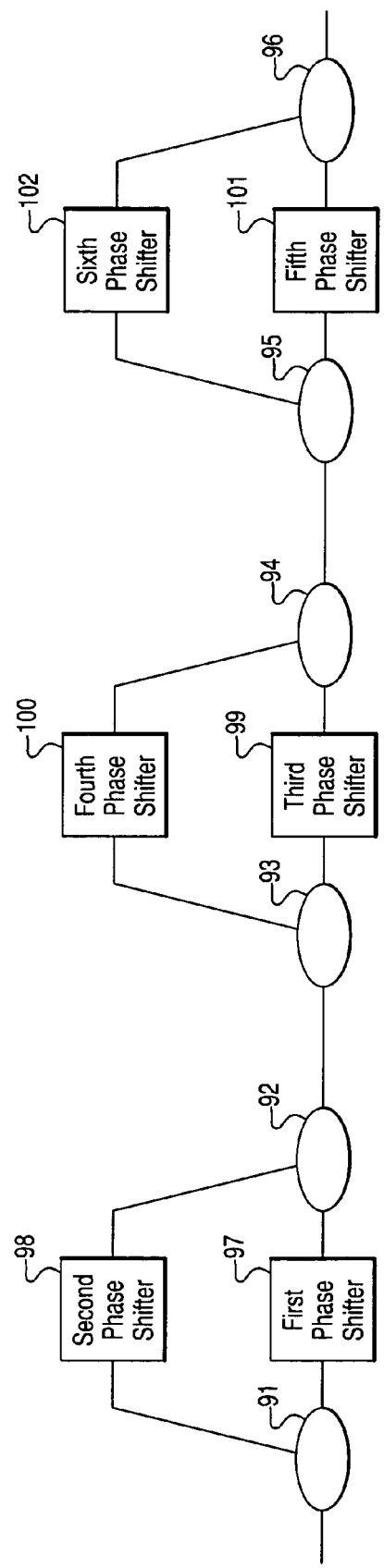
FIG. 10 is a schematic of an OTDM-CS-RZ signal generator according to an exemplary embodiment of the invention.

FIG. 10 illustrates an exemplary embodiment of an OTDM-CS-RZ signal generator for providing CS-RZ signals according to the invention. The OTDM-CS-RZ signal generator in FIG. 10 includes optical couplers 91–96 and phase shifters 97–102. The OTDM-CS-RZ signal generator comprises a first optical coupler 91 that divides a received light signal evenly as 1:1, a first phase shifter 97 that arranges the phase of one portion of the light that is divided and emitted by the first optical coupler 91, a second phase shifter 98 that arranges the phase of another portion of the light that is divided and emitted by the first optical coupler 91, a second optical coupler 92 that couples the light received from both the first phase shifter 97 and second phase shifter 98 and emits the coupled light, a third optical coupler 93 that divides the coupled light signal emitted by the second optical coupler 92 evenly as 1:1, a third phase shifter 99 that arranges the phase of one portion of the light that is divided and emitted by the third optical coupler 93, a fourth phase shifter 100 that arranges the phase of another portion of the light that is divided and emitted by the third optical coupler 93, a fourth optical coupler 94 that couples the light emitted by both the third phase shifter 99 and the fourth phase shifter 100 and emits the coupled light, a fifth optical coupler 95 that divides the light signal emitted by the fourth optical coupler 94 evenly as 1:1, a fifth phase shifter 101 that arranges the phase of one portion of the light that is divided and emitted by the fifth optical coupler 95, a sixth phase shifter 102 that arranges the phase of another portion of the light that is divided and emitted by the fifth optical coupler 95, and a sixth optical coupler 96 that couples the light emitted by both the fifth phase shifter 101 and the sixth phase shifter 102 and emits the coupled light.

Further, to balance the product of second order dispersion and the fiber length, the length of the first and the second span of transmission fiber (arranged on either side of the optical phase conjugator) are arranged accordingly. Further, the composition of the optical phase conjugator is arranged for CS-RZ transmission. The phase relationship of the CS-RZ pulses is controlled to be maintained by operating the SOA of the optical phase conjugator in a gain saturated mode induced by strong pump light.

The length of fiber for the first span and the second span $L_1$ and $L_2$, respectively, are set to 101.8 km and 106.1 km, respectively. In this case, the product of the second order dispersion, $\beta_2$, and the fiber length for the two spans is given by ($\beta_2(1)L_1$) and ($\beta_2(2)L_2$), which comes out to be −2280.6 ps² and −2280.9 ps², respectively. In the optical phase conjugator portion, the structure of the optical phase conjugator is arranged to be able to control the gain shift by receiving the intense pump light into the optical phase conjugator portion to prevent the broadening of the OPC light and phase information that is caused by the gain shift in SOAs of the optical phase conjugator.

Figure 11:
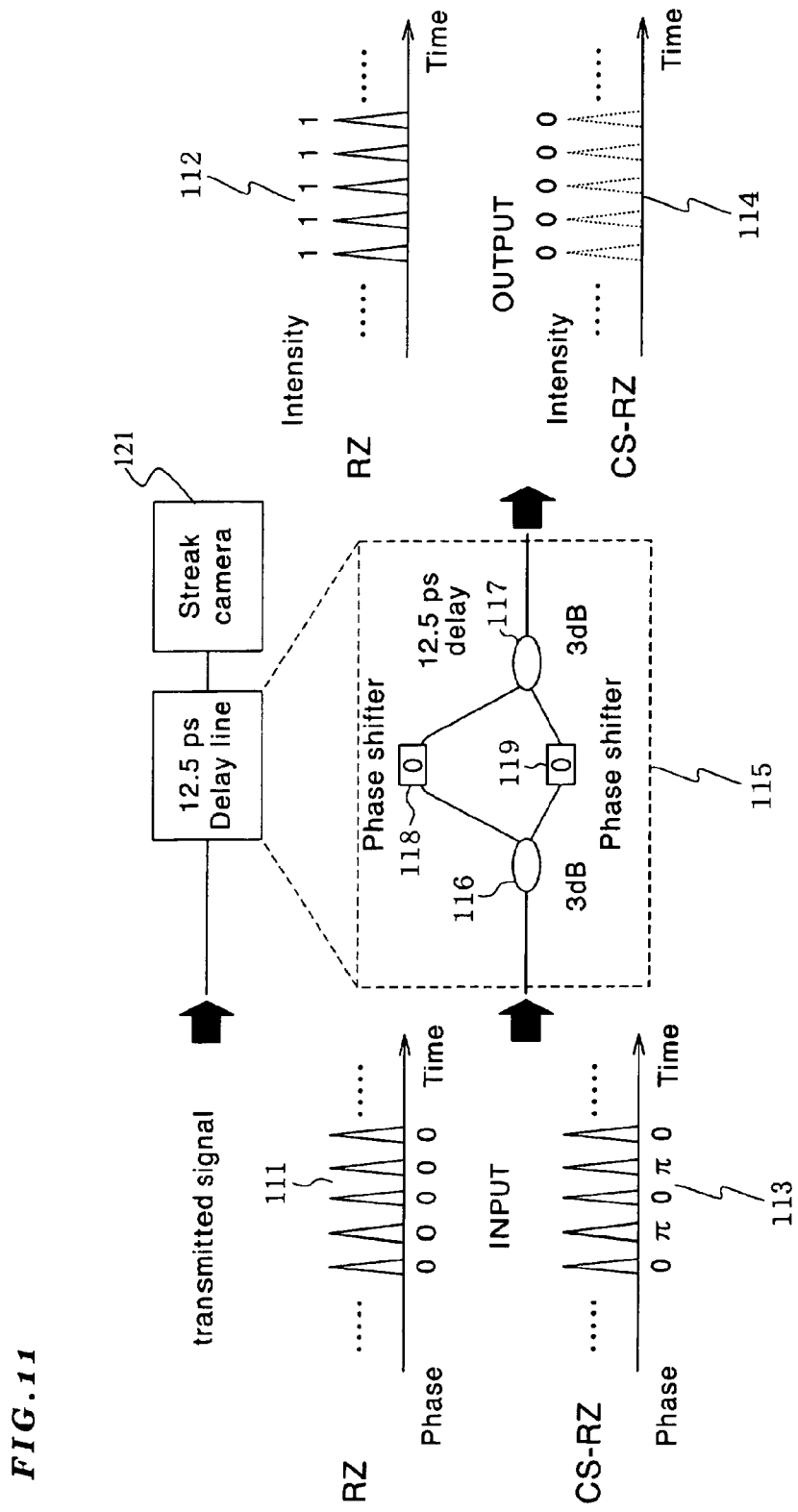
FIG. 11 illustrates an evaluation system that evaluates the phase relationship of a CS-RZ pulse train.

FIG. 11 illustrates an evaluation system 115 that evaluates the phase relationship of the CS-RZ pulse train that travels the entire transmission route. The evaluation system 115 of FIG. 11 receives received transmitted RZ signal light 111, emits emitted transmitted RZ signal light 112, receives received transmitted CS-RZ signal light 113, and emits emitted transmitted CS-RZ signal light 114. The evaluation system 115 includes optical couplers 116 and 117, and phase shifters 118 and 119. The evaluation system 115 comprises a 12.5 ps time delay device that comprises a PLC. The PLC may comprise a changeable phase shifter that is equipped with both arms of a Mach-Zhendar Interferometer (MZI). Transmitted CS-RZ signal light 113 is received in the device and the emitted light 114 is measured by a streak camera 120 and an optical spectrum analyzer (not shown).

Neighboring pulses that differ in phase by π interfere with each other when the CS-RZ pulse 113 is received, and the phase relationship is shown by the signals emitted by both arms of the MZI. Thus the received signals cancel each other out resulting in the cancelled emitted signal 114. On the other hand, in case of an RZ signal, the phase of neighboring pulses of the received light 111 is the same. Thus the pulses do not cancel each other out and the pulse train 112 is emitted.

Figure 12A:
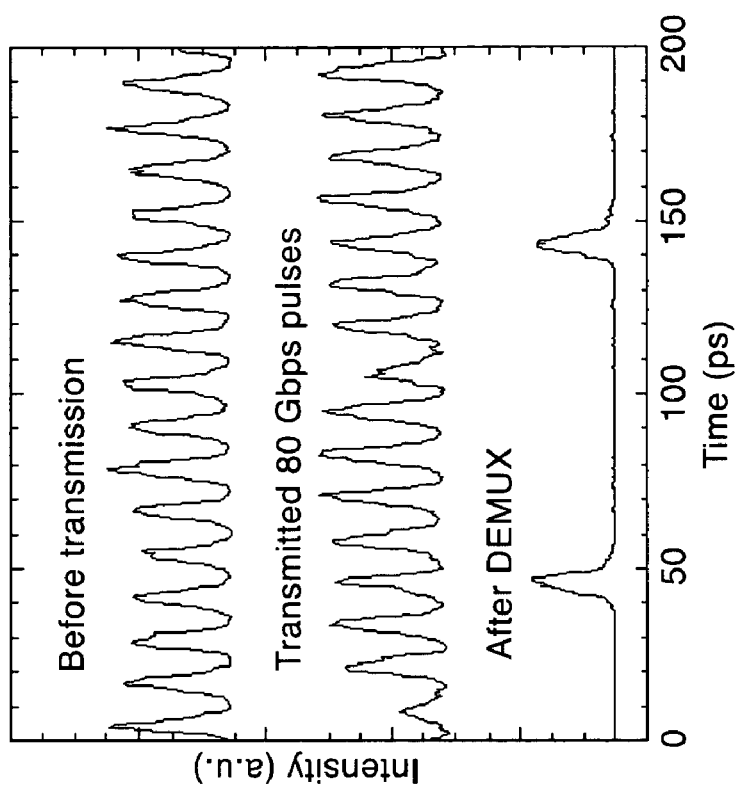
FIG. 12(a) illustrates an optical spectra of a signal emitted from an optical phase conjugator according to an exemplary embodiment of the invention.
Figure 12B:
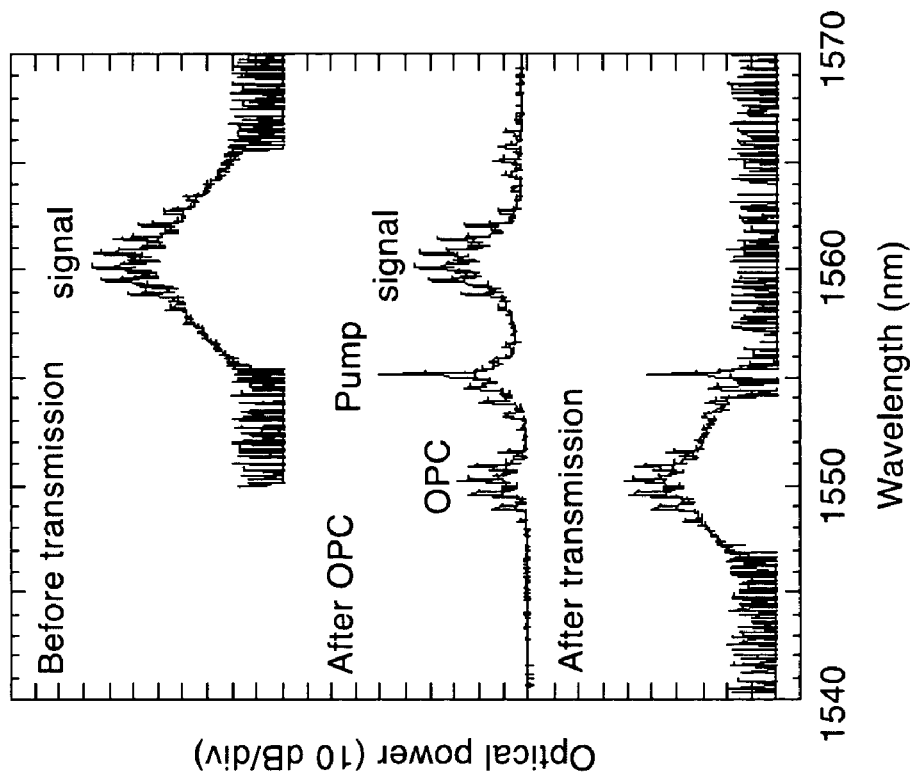
FIG. 12(b) illustrates a waveform in the time domain of a signal emitted from an optical phase conjugator according to an exemplary embodiment of the invention.

FIGS. 12(*a*) and 12(*b*) illustrate a signal emitted from the optical phase conjugator. According to an embodiment of the invention, FIG. 12(*a*) and FIG. 12(*b*) respectively illustrate optical spectra and waveforms in the time domain when an RZ signal is transmitted over 208 km of fiber by using OPC. The upper spectrum of FIG. 12(*a*) illustrates the OTDM signal at 80 Gbit/s, the middle spectrum of the FIG. 12(*a*) illustrates the optical spectrum at the emitting end of an SOA of the optical phase conjugator, and the lower spectrum of the FIG. 12(*a*) illustrates the spectrum after transmission.

Figure 13:
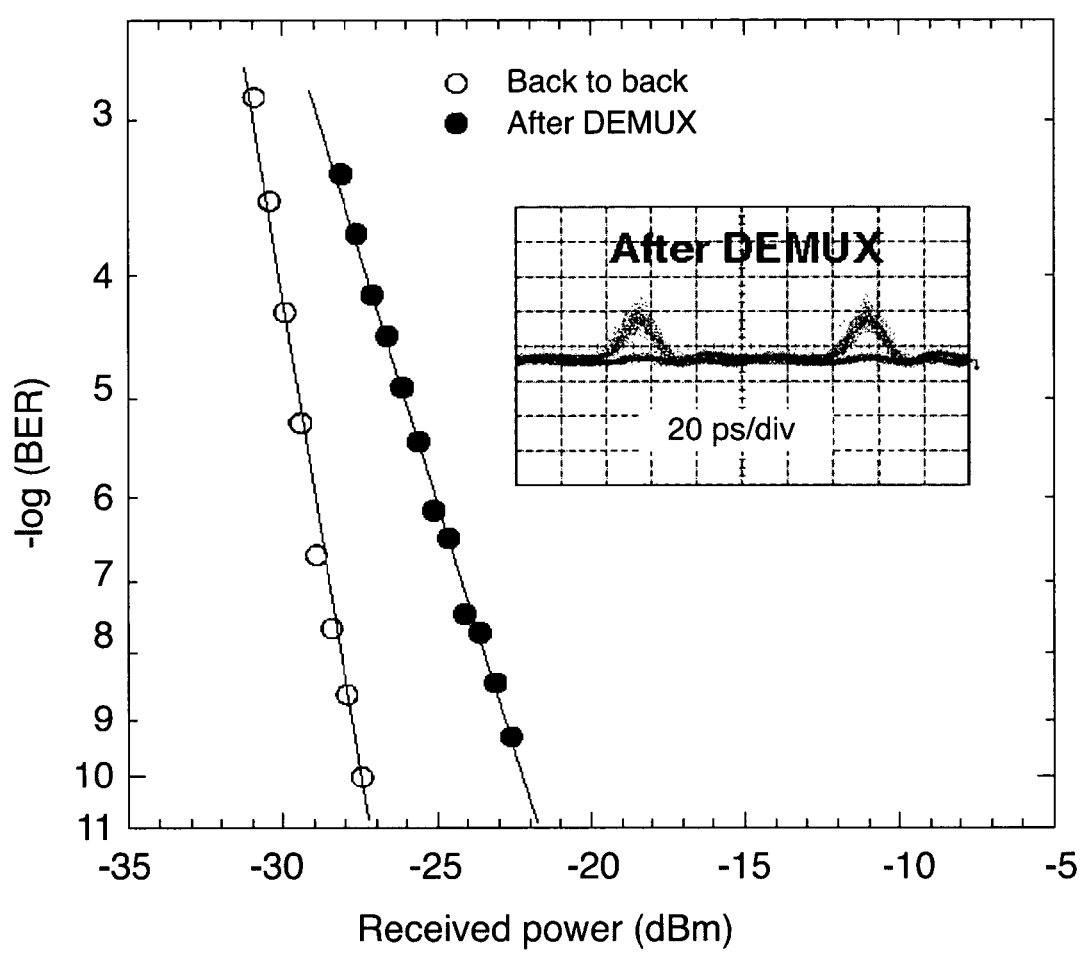
FIG. 13 illustrates the result of the measured bit error rate (BER) of a transmission signal according to an exemplary embodiment of the invention. The inset of FIG. 13 illustrates an eye diagram after multi separating.

The conversion efficiency of the spectral inversion (FWM intensity/signal intensity) is −18.0 dB, and the signal to noise ratio (FWM intensity/Amplified Spontaneous Emission intensity) is 26.9 dB. FIG. 12(*b*) illustrates the streak camera traces of signals before transmission (upper curve), after transmission (middle curve), and after DEMUX (lower curve). The pulse width measured by self correlation is 2.9 ps and broadened to 4.7 ps after transmission over 208 km of fiber (the pulse width was measured by the streak camera). This broadening of the pulse is thought to result from the third order dispersion of SSMF (See K. Kikuchi, and K. Matsuura, "Transmission of 2-ps optical pulses at 1550 nm over 40-km standard fiber using midspan optical phase conjugation in semiconductor optical amplifiers," *IEEE Photon. Technol. Lett.*, 1998, 10, (10), pp. 1410–1412). FIG. 13 illustrates the result of measured bit error rate (BER) of the transmission signal. The inset of FIG. 13 illustrates an eye diagram after multi separating. The received power for which the BER is $10^{-9}$ is −22.8 dBm. The power penalty for back-to-back corresponding to an error rate of $10^{-9}$ after the transmission is 4.9 dB.

Figure 14B:
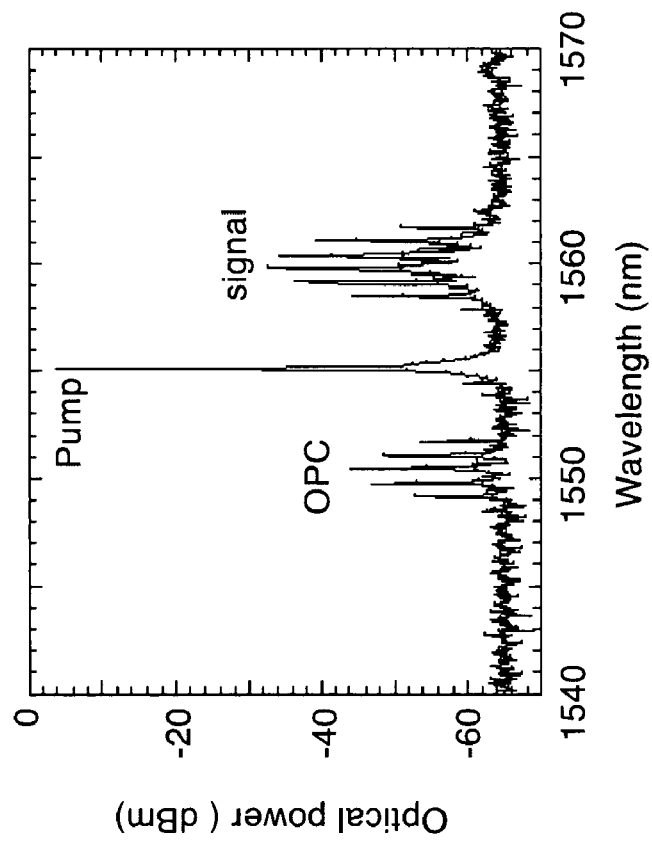
FIG. 14(b) illustrates a waveform in the time domain of a signal emitted from the emission end of an SOA of an optical phase conjugator according to an exemplary embodiment of the invention.
Figure 14A:
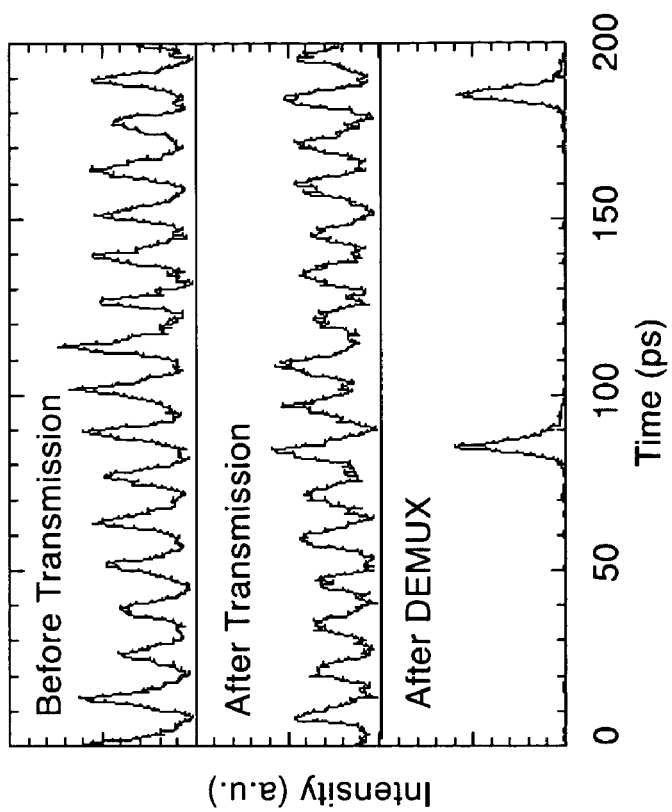
FIG. 14(a) illustrates an optical spectra of a signal emitted from the emission end of an SOA of an optical phase conjugator according to an exemplary embodiment of the invention.
Figure 15:
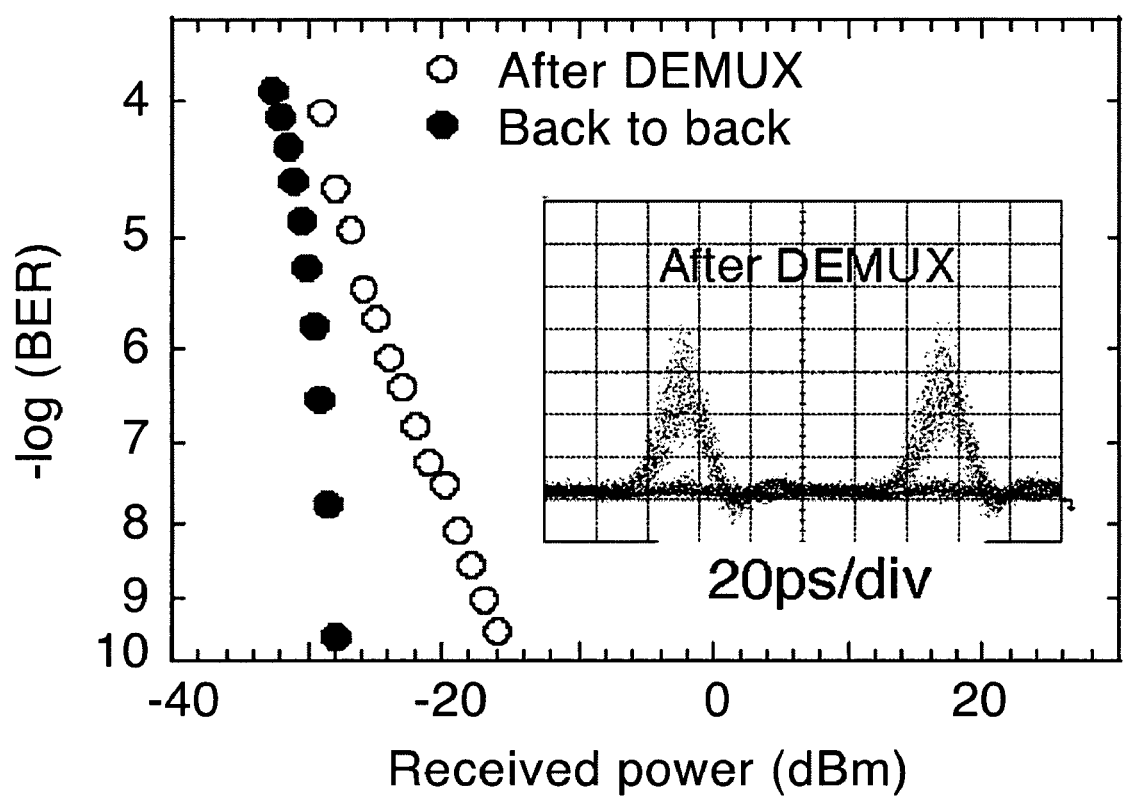
FIG. 15 illustrates the result of measurement of the error of 80 Gbit/s RZ signals after transmission. The inset of FIG. 15 illustrates the eye diagram after DEMUX.

FIG. 14(*a*) illustrates an emission spectrum at the emission end of the SOA in the optical phase conjugator. FIG. 14(*b*) illustrates waveforms of the pulses in the time domain. As shown in the optical spectrum of the optical phase conjugator in FIG. 14(*a*), it is clear that the modulating effect of the pump light on the OPC signal is suppressed from the increase of pump light power and suppression of signal light power. The conversion efficiency of the spectral inversion was −11.5 dB and the noise-to-noise ratio was 20.5 dB. FIG. 15 illustrates spectra corresponding to the streak Camera traces for bit error rates after DEMUX. As illustrated in FIG. 15, at a bit error rate of $10^{-9}$ the received power after the transmission was −16.9 dBm, and the power penalty for back-to-back was 11.3 dB. The inset of FIG. 15 illustrates the eye diagram after DEMUX.

Figure 16:
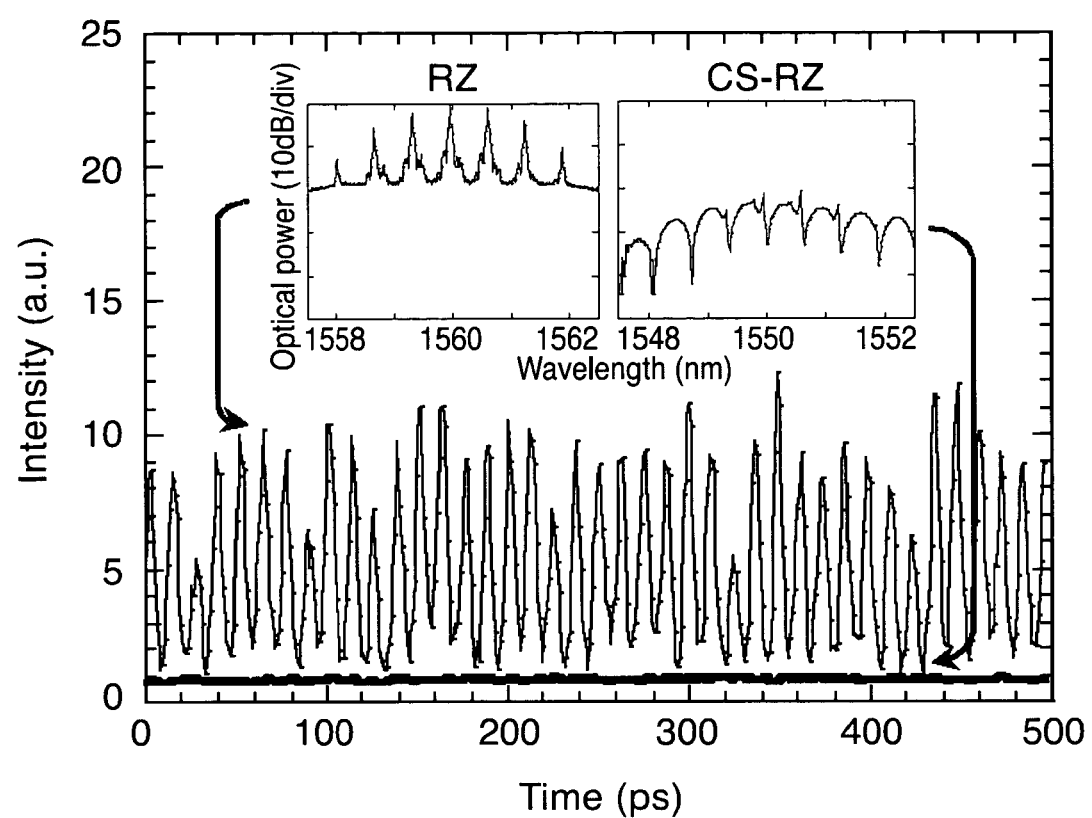
FIG. 16 illustrates the result of measurement of the phase relationship of CS-RZ signals according to an exemplary embodiment of the invention.

FIG. 16 illustrates the result of a measurement for the phase relationship of CS-RZ. When a RZ signal is used, because the phase of neighboring pulses remain the same for RZ, a pulse train is emitted (the result is back-to-back). As is shown the optical spectrum, modulated signals, the frequency intervals of which are 80 GHz (wavelength intervals are about 0.64 nm), and high order signals thereof are emitted. On the other hand, when transmitted CS-RZ signals are received into the evaluation system, emission signals are not measured as shown in FIG. 16. Further, as shown in the inset spectrum, it is known that modulated signals, the intervals of which are 80 GHz, and the high order signals thereof are suppressed by interference. That is to say, it shows that CS-RZ signals could be transmitted using OPC.

As described above in embodiments of the invention, it is possible to transmit 80 Gbit/s OTDM signals over 208 km of SSMF by using OPC. Further, an optical signal transmission device according to embodiments of the invention can transmit CS-RZ signals while maintaining phase information. Therefore, the present invention is applicable, for example, to OTDM communication using CS-RZ signals.

What is claimed is:

1. An optical signal transmission device for transmitting phase information of optical signals comprising:

a multiplexing formatted optical signal generator arranged to generate multiplexing formatted optical signals; and an optical phase generator arranged to receive the multiplexing formatted optical signals, wherein the multiplexing formatted optical signal generator comprises an optical time division multiplexing (OTDM) carrier suppressed—return to zero (CS-RZ) signal generator arranged to generate OTDM-CS-RZ signals comprising signal light, and wherein the optical phase generator comprises an optical phase conjugator arranged to receive the OTDM-CS-RZ signals from the OTDM CS-RZ signal generator, wherein said optical phase conjugator comprises:

a continuous wave (CW) pump light source that emits pump light;

a pump light amplifier arranged to amplify the pump light emitted by the CW pump light source;

a first phase conjugator arranged to arrange the phase of the signal light;

a signal light amplifier arranged to amplify the signal light;

a second phase conjugator arranged to arrange the phase of the signal light; an optical coupler arranged to couple the signal light and the pump light from the first phase conjugator and the second phase conjugator and emit the coupled light;

a first and a second semiconductor amplifier (SOA) arranged to amplify the coupled light and provide phase conjugated light; and a light filter arranged to filter the phase conjugated light from the second SOA.

2. An optical signal transmission device for transmitting phase information of optical signals comprising:

a multiplexing formatted optical signal generator arranged to generate multiplexing formatted optical signals; and an optical phase generator arranged to receive the multiplexing formatted optical signals, wherein said multiplexing formatted optical signal generator comprises:

a first optical coupler arranged to divide a received signal evenly at a rate of 1:1 into a first portion and a second portion;

a first phase shifter arranged to receive the first portion and to arrange the phase of the first portion;

a second phase shifter arranged to receive the second portion and to arrange the phase of the second portion;

a second optical coupler arranged to couple the light emitted by the first phase shifter with the light emitted by the second phase shifter and emit a first coupled signal;

a third optical coupler arranged to divide the first coupled signal evenly at a rate of 1:1 into a third portion and a fourth portion;

a third phase shifter arranged to receive the third portion and to arrange the phase of the third portion;

a fourth phase shifter arranged to receive the fourth portion and to arrange the phase of the fourth portion; and a fourth optical coupler arranged to couple the light emitted by the third phase shifter with the light emitted by the fourth phase shifter and emit a second coupled signal.

3. An optical signal transmission device as claimed in claim 2, further comprising:

a fifth optical coupler arranged to divide the second coupled signal evenly at a rate of 1:1 into a fifth portion and a sixth portion;

a fifth phase shifter arranged to receive the fifth portion and to arrange the phase of the fifth portion;

a sixth phase shifter arranged to receive the sixth portion and to arrange the phase of the sixth portion; and a sixth optical coupler arranged to couple the light emitted by the fifth phase shifter with the light emitted by the sixth phase shifter and emit a third coupled signal.

4. An optical information transmission method for transmitting optical signal information including phase information comprising:

receiving multiplexing formatted optical signals generated by a multiplexing formatted optical signal generator at an optical phase generator;

phase conjugating the multiplexing formatted optical signals by means of four wave mixing (FWM); and generating the multiplexing formatted optical signals using the multiplexing formatted optical signal generator, wherein the generating the multiplexing formatted optical signals comprises:

dividing a received signal evenly at a rate of 1:1 into a first portion and a second portion;

arranging the phase of the first portion;

arranging the phase of the second portion;

coupling the first portion having a conjugated phase and the second portion having a conjugated phase to provide a first coupled signal;

dividing the first coupled signal evenly at a rate of 1:1 into a third portion and a fourth portion;

arranging the phase of the third portion;

arranging the phase of the fourth portion; and coupling the third portion having a conjugated phase and the fourth portion having a conjugated phase to provide a second coupled signal.

5. An optical information transmission method in claim 4, wherein the generating the multiplexing formatted optical signals further comprises:

dividing the second coupled signal evenly at a rate of 1:1 into a fifth portion and a sixth portion;

arranging the phase of the fifth portion;

arranging the phase of the sixth portion; and coupling the fifth portion having an arranged phase and the sixth portion having an arranged phase to provide a third coupled signal.

* * * * *